United States Patent
Wang

(10) Patent No.: US 11,355,130 B2
(45) Date of Patent: Jun. 7, 2022

(54) AUDIO CODING AND DECODING METHODS AND DEVICES, AND AUDIO CODING AND DECODING SYSTEM

(71) Applicant: HANGZHOU HIKVISION DIGITAL TECHNOLOGY CO., LTD., Zhejiang (CN)

(72) Inventor: Xinghe Wang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/648,626

(22) PCT Filed: Sep. 18, 2018

(86) PCT No.: PCT/CN2018/106298
§ 371 (c)(1),
(2) Date: Mar. 18, 2020

(87) PCT Pub. No.: WO2019/052582
PCT Pub. Date: Mar. 21, 2019

(65) Prior Publication Data
US 2020/0219519 A1    Jul. 9, 2020

(30) Foreign Application Priority Data
Sep. 18, 2017 (CN) .......................... 201710840992.2

(51) Int. Cl.
*G10L 19/005*   (2013.01)
*G10L 19/22*    (2013.01)
*H04L 43/0829*  (2022.01)

(52) U.S. Cl.
CPC ............ *G10L 19/005* (2013.01); *G10L 19/22* (2013.01); *H04L 43/0829* (2013.01)

(58) Field of Classification Search
CPC ..................................................... G10L 19/005
See application file for complete search history.

(56) References Cited

U.S. PATENT DOCUMENTS 6,757,654 B1 * 6/2004 Westerlund ........... G10L 19/005
704/219
8,171,355 B2   5/2012 Kameyama et al.
(Continued)

FOREIGN PATENT DOCUMENTS

CN    101039260 A    9/2007
CN    101047604 A    10/2007
(Continued)

OTHER PUBLICATIONS

First Office Action of Chinese Application No. 201710840992.2 and it's English Translation—17 pages (dated Sep. 29, 2020).
(Continued)

*Primary Examiner* — Douglas Godbold
(74) *Attorney, Agent, or Firm* — Knobbe Martens Olson & Bear LLP

(57) ABSTRACT

An audio coding method, comprising: obtaining an $i^{th}$ audio frame in n consecutive audio frames and obtaining an $i^{th}$ piece of coded data and an $i^{th}$ piece of redundant data based on the $i^{th}$ audio frame, wherein the $i^{th}$ piece of coded data is obtained by coding the $i^{th}$ audio frame, and the $i^{th}$ piece of redundant data is obtained by coding and buffering the $i^{th}$ audio frame, wherein n is a positive integer, and $1 \leq i \leq n$; and packing the $i^{th}$ piece of coded data and at most m pieces of redundant data before the $i^{th}$ piece of redundant data into an $i^{th}$ audio data packet, wherein m is a preset positive integer. An audio decoding method and a computer device are further provided.

15 Claims, 7 Drawing Sheets

(56) References Cited

U.S. PATENT DOCUMENTS

| | | | | |
|---|---|---|---|---|
| 2005/0228651 A1* | 10/2005 | Wang | ............... | G10L 19/08 704/207 |
| 2009/0103517 A1* | 4/2009 | Ohmuro | ............... | H04L 65/602 370/352 |
| 2014/0026020 A1* | 1/2014 | Feldbauer | ............... | H04N 19/164 714/776 |
| 2015/0039323 A1* | 2/2015 | Ishikawa | ............... | G10L 19/0017 704/500 |
| 2015/0078372 A1* | 3/2015 | Mani | ............... | H04L 1/08 370/352 |
| 2015/0249835 A1* | 9/2015 | Yie | ............... | G06F 11/076 375/240.02 |
| 2017/0125029 A1* | 5/2017 | Atti | ............... | H04L 1/007 |

FOREIGN PATENT DOCUMENTS

| | | |
|---|---|---|
| CN | 101777960 A | 7/2010 |
| CN | 102025717 A | 4/2011 |
| CN | 103050123 A | 4/2013 |
| CN | 103280222 A | 9/2013 |
| CN | 103957222 A | 7/2014 |
| CN | 104917671 A | 9/2015 |
| CN | 106130696 A | 11/2016 |
| CN | 106571893 A | 4/2017 |
| EP | 1056297 A2 | 11/2000 |
| EP | 1094630 A2 | 4/2001 |
| EP | 1981170 A1 | 10/2008 |
| WO | 01/86637 A1 | 11/2001 |
| WO | 02/093556 A1 | 11/2002 |

OTHER PUBLICATIONS

Extended European Search Report of EP Application No. 18856710. 1—8 pages (dated Oct. 22, 2020).

International search report for PCT application No. PCT/CN2018/106298 dated Dec. 20, 2018.

\* cited by examiner

US 11,355,130 B2

AUDIO CODING AND DECODING METHODS AND DEVICES, AND AUDIO CODING AND DECODING SYSTEM

This application is a national phase of a PCT application PCT/CN2018/106298, filed on Sep. 18, 2018, which claims priority to Chinese Patent Application No. 201710840992.2, filed on Sep. 18, 2017 and entitled "AUDIO CODING AND DECODING METHODS AND DEVICES, AND AUDIO CODING AND DECODING SYSTEM", the entire contents of which are incorporated herein by reference.

TECHNICAL FIELD

Embodiments of the present disclosure relates to an audio coding method, an audio decoding method, an audio coding device, an audio decoding device, and an audio coding and decoding system.

BACKGROUND

To reduce a data size of audio data during transmission, a transmitting end codes source audio data so as to obtain compressed data and transmits the compressed data to a receiving end. The receiving end decodes the compressed data that is received to obtain the source audio data.

The source audio data is constituted by consecutive audio frames. An audio frame is audio data that lasts 20 ms or 40 ms. The audio frames are sequentially coded and compressed so as to obtain compressed data packets. If condition of a network is relatively poor, some data packets may be lost during the transmission of compressed data packets. As a result, some audio frames of the audio data received by the receiving end are lost, and sound will be played interruptedly or frozenly. To resolve the problem of data packet loss, in related arts, the transmitting end transmits a redundant data packet (F) after transmitting a group of compressed data packets (corresponding to an audio frame D1, an audio frame D2, and an audio frame D3). The redundant data packet is used to restore a lost audio frame in the group of compressed data packets. For example, if the compressed data packet corresponding to the audio frame D1 is lost, the receiving end continues to receive the compressed data packet (corresponding to the audio frame D2), the compressed data packet (corresponding to the audio frame D3), and the redundant data packet (F). When the redundant data packet (F) is received, data corresponding to the lost audio frame D1 is searched for from the redundant data packet (F) according to a time stamp corresponding to the lost audio frame D1, and the lost audio frame D1 will be restored.

After a compressed data packet is lost, the receiving end needs to receive a redundant data packet before restoring decoding the lost compressed data packets. It is assumed that an audio frame lasts 20 ms. If the audio frame D1 is lost, it will take 60 ms to wait for the redundant data packet and restore the audio frame D1 through the redundant data packet, resulting in relatively long latency.

SUMMARY

At least one embodiment of the present disclosure provides an audio coding method. The method includes:

obtaining an $i^{th}$ audio frame in n consecutive audio frames and obtaining an $i^{th}$ piece of coded data and an $i^{th}$ piece of redundant data based on the $i^{th}$ audio frame, wherein the $i^{th}$ piece of coded data is obtained by coding the $i^{th}$ audio frame, and the $i^{th}$ piece of redundant data is obtained by coding and buffering the $i^{th}$ audio frame, wherein i is a positive integer, n is a positive integer, and $1 \le i \le n$; and packing the $i^{th}$ piece of coded data and at most m pieces of redundant data before the $i^{th}$ piece of redundant data into an $i^{th}$ audio data packet, wherein m is a preset positive integer.

In some embodiments of the present disclosure, packing the $i^{th}$ piece of coded data and the at most m pieces of redundant data before the $i^{th}$ piece of redundant data into the $i^{th}$ audio data packet includes at least one of the following steps:

packing a first piece of coded data into a first audio data packet when i=1;

packing the $i^{th}$ piece of coded data and (i−1) pieces of redundant data before the buffered $i^{th}$ piece of redundant data into the $i^{th}$ audio data packet when $1 < i \le m$; and packing the $i^{th}$ piece of coded data and a buffered $(i-m)^{th}$ piece of redundant data to a buffered $(i-1)^{th}$ piece of redundant data into the $i^{th}$ audio data packet when $m < i \le n$.

In some embodiments of the present disclosure, the method further includes:

receiving at least one of a packet loss ratio transmitted by a receiving end and consecutive packet loss information, wherein the consecutive packet loss information is used to indicate a quantity of consecutive lost packets; and determining a value of m according to at least one of the packet loss ratio and the consecutive packet loss information, wherein the value of m is positively correlated with the packet loss ratio.

In some embodiments of the present disclosure, the method further includes:

receiving a packet loss ratio transmitted by a receiving end; and after packing a current audio data packet, adjusting, according to the packet loss ratio, a sampling rate and/or a compression ratio for coding subsequent audio frames, wherein the sampling rate is positively correlated with the packet loss ratio, and the compression ratio is negatively correlated with the packet loss ratio.

In some embodiments of the present disclosure, obtaining the $i^{th}$ piece of coded data by coding the $i^{th}$ audio frame, and obtaining the $i^{th}$ piece of redundant data by buffering the $i^{th}$ piece of coded data includes:

coding the $i^{th}$ audio frame through a first coding scheme to obtain an $i^{th}$ piece of first coded data; and coding the $i^{th}$ audio frame through a second coding scheme to obtain an $i^{th}$ piece of second coded data, and buffering the $i^{th}$ piece of second coded data as the $i^{th}$ piece of redundant data.

In some embodiments of the present disclosure, the method further includes:

receiving a packet loss ratio transmitted by a receiving end; and determining the second coding scheme according to the packet loss ratio.

In some embodiments of the present disclosure, the method further includes:

collecting a sound signal to obtain source audio data, wherein the source audio data includes the n consecutive audio frames.

At least one embodiment of the present disclosure provides an audio decoding method. The method includes:

receiving a current audio data packet;

when lost coded data exists before an audio frame corresponding to current coded data in the current audio data packet, selecting target redundant data from redundant data in the current audio data packet, wherein an audio frame corresponding to the target redundant data is the same as an lost audio frame; and decoding the target redundant data and the current coded data.

In some embodiments of the present disclosure, the method further includes:

when a timestamp of the current coded data and a timestamp of the received coded data are not consecutive and the timestamp of the current coded data and a timestamp of the received redundant data are not consecutive, determining that the lost coded data exists before the current coded data.

In some embodiments of the present disclosure, selecting the target redundant data from the redundant data in the current audio data packet includes:

selecting, according to a timestamp of the redundant data in the current audio data packet, redundant data with a timestamp that is different from a timestamp of the received coded data and is different from a timestamp of the received redundant data as the target redundant data.

In some embodiments of the present disclosure, decoding the target redundant data and the current coded data includes:

sorting the target redundant data and the current coded data according to the timestamp of the target redundant data and a timestamp of the current coded data, wherein a quantity of pieces of target redundant data is w, and w is a positive integer; and sequentially decoding the target redundant data and the current coded data in ascending order of timestamps, to obtain (w+1) pieces of audio frames.

In some embodiments of the present disclosure, the method further includes:

calculating a current packet loss ratio every predetermined duration; and transmitting the current packet loss ratio to a transmitting end.

At least one embodiment of the present disclosure provides an audio coding apparatus. The audio coding apparatus includes: a processor, and a memory which stores at least one instruction, when the at least one instruction is loaded and executed by the processor, the process is configured to: obtain an $i^{th}$ audio frame in n consecutive audio frames and obtaining an $i^{th}$ piece of coded data and an $i^{th}$ piece of redundant data based on the $i^{th}$ audio frame, wherein the $i^{th}$ piece of coded data is obtained by coding the $i^{th}$ audio frame, and the $i^{th}$ piece of redundant data is obtained by coding and buffering the $i^{th}$ audio frame, wherein i is a positive integer, n is a positive integer, and $1 \le i \le n$; and pack the $i^{th}$ piece of coded data and at most m pieces of redundant data before the $i^{th}$ piece of redundant data into an $i^{th}$ audio data packet, wherein m is a preset positive integer.

At least one embodiment of the present disclosure provides an audio decoding apparatus. The audio decoding apparatus includes: a processor, and a memory which stores at least one instruction, when the at least one instruction is loaded and executed by the processor, the process is configured to: receive a current audio data packet; when lost coded data exists before an audio frame corresponding to current coded data in the current audio data packet, select target redundant data from redundant data in the current audio data packet, wherein an audio frame corresponding to the target redundant data is the same as an lost audio frame; and decode the target redundant data and the current coded data.

At least one embodiment of the present disclosure provides an audio coding and decoding system, including the audio coding apparatus as described above and the audio decoding apparatus as described above.

At least one embodiment of the present disclosure provides a computer device. The computer device includes a processor and a memory, wherein the memory stores at least one instruction, which is loaded and executed by the processor to implement the audio coding method described above.

At least one embodiment of the present disclosure provides a computer device. The computer device includes a processor and a memory, wherein the memory stores at least one instruction, which is loaded and executed by the processor to implement the audio decoding method described above.

DETAILED DESCRIPTION

Embodiments of the present disclosure will be described in further detail with reference to the accompanying drawings, to present the principles and advantages of the present disclosure more clearly.

To facilitate the understanding of the embodiments of the present disclosure, related terms will be introduced first:

Source audio data is digital audio data that is obtained by sampling and quantizing an analog signal corresponding to a sound signal, and is not compressed. The source audio data may be pulse code modulation (PCM) data.

A sampling rate is the number of samples that are taken from consecutive analog signals and form discrete signals per second.

A compression ratio is a ratio of size of audio data after coding and compression to size before compression.

Figure 1:
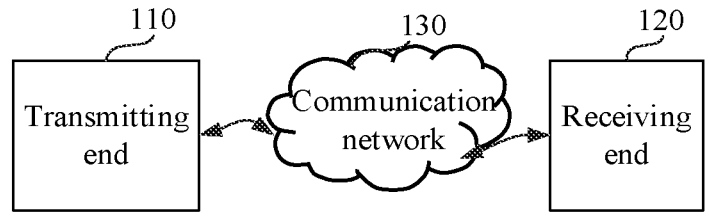
FIG. 1 is a schematic diagram of an implementation environment related to audio coding and audio decoding according to some embodiments.

FIG. 1 is a schematic diagram of an implementation environment for audio coding and audio decoding according to some embodiments. As illustrated in FIG. 1, the implementation environment mainly comprises a transmitting end 110, a receiving end 120, and a communication network 130.

The transmitting end 110 is configured to, after receiving or obtaining a sound signal, sample the sound signal to obtain source audio data, then code and compress the source audio data, and pack the coded and compressed data into an audio data packet and transmit the audio data packet.

The receiving end 120 is configured to receive the audio data packet, and decode the coded and compressed data in the audio data packet to obtain the source audio data, to feed the source audio data into a sound card for play.

The communication network 130 may be a wired communication network or may be a wireless communication network. In this embodiment, a physical implementation of the communication network 130 is not limited.

Figure 2:
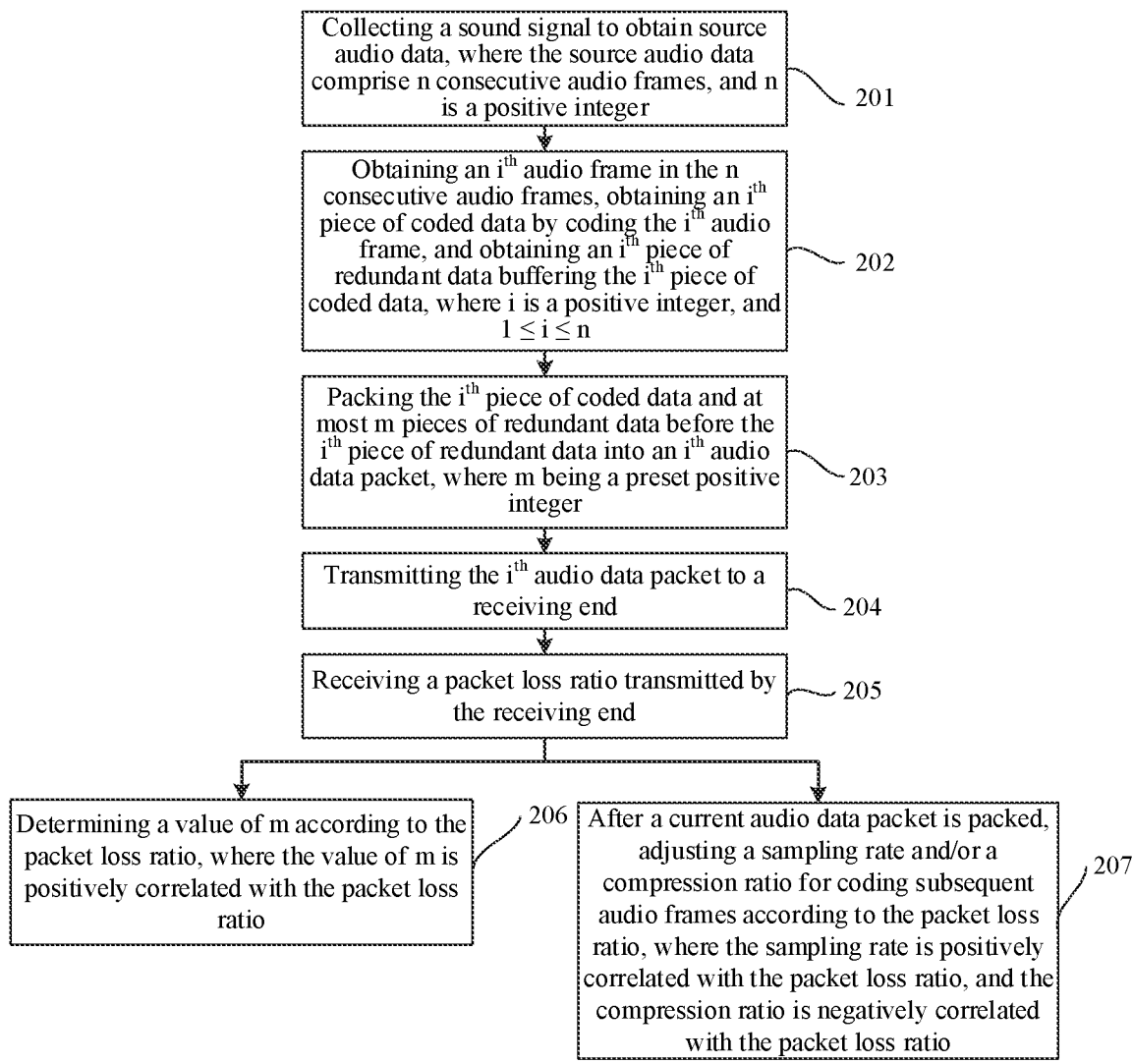
FIG. 2 is a flowchart of an audio coding method according to an embodiment of the present disclosure.

FIG. 2 is a flowchart of an audio coding method according to an embodiment of the present disclosure. For example, the audio coding method is applicable to the transmitting end 110 as illustrated in FIG. 1. As illustrated in FIG. 2, the audio coding method may comprise the following steps.

In Step 201, a sound signal is collected to obtain source audio data, where the source audio data comprise n consecutive audio frames, and n is a positive integer.

Collecting a sound signal refers to sampling and quantizing an analog signal corresponding to the sound signal, and digital audio data obtained is the source audio data. In some embodiments of the present disclosure, the source audio data is PCM data.

An audio frame is a part of the source audio data. The audio frame is source audio data corresponding to predetermined duration. The predetermined duration is typically 20 ms or 40 ms.

In step 202, an $i^{th}$ audio frame in the n consecutive audio frames is obtained, an $i^{th}$ piece of coded data is obtained by coding the $i^{th}$ audio frame, and an $i^{th}$ piece of redundant data is obtained by buffering the $i^{th}$ piece of coded data, where i is a positive integer, and $1 \le i \le n$.

Coded data is data obtained by coding and compressing source audio data. Redundant data is data buffered after coding and buffering source audio data.

In this embodiment, the same coding scheme is used for the coded data and the redundant data. In this case, the $i^{th}$ piece of coded data can be directly buffered as the $i^{th}$ piece of redundant data. In this way, one audio frame only needs to be coded once.

For example, the coding scheme used by the transmitting end for coding may be advanced audio coding (AAC).

In some embodiments of the present disclosure, different coding schemes are used for the coded data and the redundant data.

In some embodiments of the present disclosure, the coding scheme used by the transmitting end for coding comprises a first coding scheme and a second coding scheme. In this case, step 202 may be replaced with steps illustrated in FIG. 3:

In step 202a, an $i^{th}$ audio frame is coded through a first coding scheme to obtain an $i^{th}$ piece of coded data.

For example, the $i^{th}$ audio frame is coded through the first coding scheme to obtain an $i^{th}$ piece of first coded data, and the $i^{th}$ piece of first coded data is used as the $i^{th}$ piece of coded data during subsequent packing.

In an optional embodiment, the first coding scheme is usually kept unchanged after being determined.

In step 202b, the $i^{th}$ audio frame is coded through a second coding scheme and buffered to obtain an $i^{th}$ piece of redundant data.

For example, the $i^{th}$ audio frame is coded through the second coding scheme to obtain an $i^{th}$ piece of second coded data, and the $i^{th}$ piece of second coded data is buffered as the $i^{th}$ piece of redundant data. In this case, the $i^{th}$ piece of second coded data and the $i^{th}$ piece of redundant data have same content.

In some embodiments of the present disclosure, it is chosen that the second coding scheme is a coding scheme different from the first coding scheme. Because coding parameters of one coding scheme can be adjusted in a limited range, when different coding schemes are used, the coding parameters can be changed in a larger range upon adjustment. Herein, the coding parameters comprise at least one of a compression ratio and a sampling rate.

Redundant data obtained by coding through the second coding scheme is buffered, and the buffered redundant data is used as redundant data during subsequent packing of audio frames.

The coded data is buffered, so that during the subsequent packing of audio frames, the buffered redundant data can be directly obtained, thereby improving the efficiency of packing.

In step 203, the $i^{th}$ piece of coded data and at most m pieces of redundant data before the $i^{th}$ piece of redundant data are packed into an $i^{th}$ audio data packet, where m is a preset positive integer.

During packing the $i^{th}$ audio data packet, the $i^{th}$ piece of coded data obtained by coding the $i^{th}$ audio frame and redundant data before the $i^{th}$ piece of redundant data are packed together.

In an optional embodiment, during packing the $i^{th}$ audio data packet, the $i^{th}$ piece of first coded data obtained by coding the $i^{th}$ audio frame through the first coding scheme and redundant data before the $i^{th}$ piece of redundant data are packed together.

Figure 3:
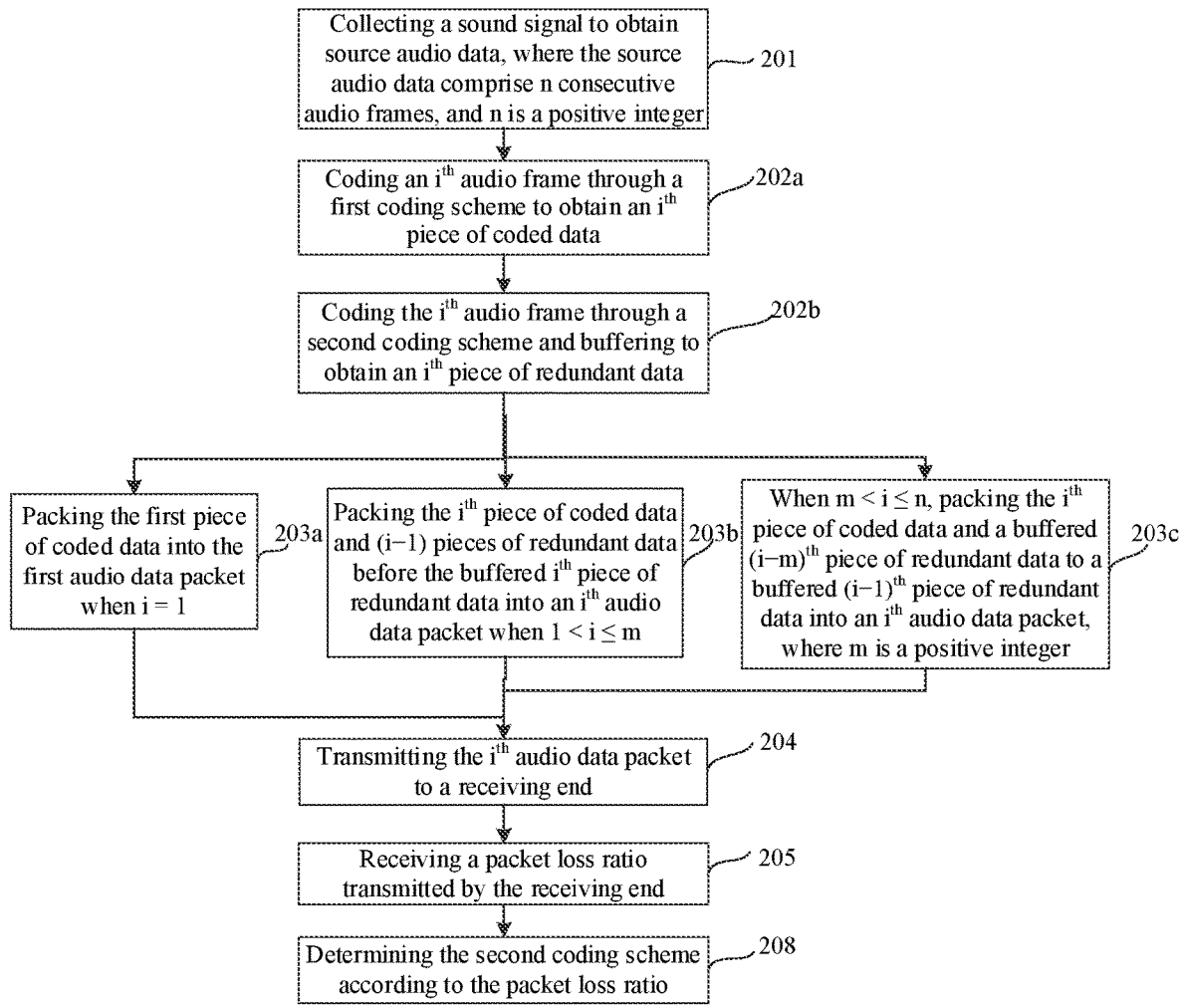
FIG. 3 is a flowchart of an audio coding method according to an embodiment of the present disclosure.

In some embodiments of the present disclosure, step 203 can be replaced with any one or a combination of at least two of step 203a, step 203b, and step 203c in FIG. 3.

In step 203a, the first piece of coded data is packed into the first audio data packet when i=1.

For the first audio frame, because there is no audio frame before the first audio frame, after the transmitting end codes the first audio frame to obtain the first piece of coded data, the first piece of coded data is directly packed into the first audio data packet, and there is no redundant data corresponding to other audio frame in the first audio data packet.

In step 203b, the $i^{th}$ piece of coded data and (i−1) pieces of redundant data before the buffered $i^{th}$ piece of redundant data are packed into an $i^{th}$ audio data packet when $1 < i \le m$.

If $i \le m$, that is, the quantity of all audio frames before a current audio frame is less than m, during packing the current audio frame, redundant data corresponding to all the audio frames before the current audio frame and coded data of the current audio frame are packed together into an audio data packet. That is, the transmitting end packs the first piece of redundant data to the $(i-1)^{th}$ piece of redundant data and the coded data of the current audio frame together into an audio data packet.

In step 203c, when $m < i \le n$, the $i^{th}$ piece of coded data and a buffered $(i-m)^{th}$ piece of redundant data to a buffered $(i-1)^{th}$ piece of redundant data are packed into an $i^{th}$ audio data packet, where m is a positive integer.

During packing a current audio frame, redundant data corresponding to the current frame is obtained. The redundant data corresponding to the current audio frame is data buffered after m previous audio frames before the current frame are coded.

As duration corresponding to one audio frame is usually 20 ms or 40 ms. the size of one audio frame is usually relatively small. Even if an audio data packet includes coded data and redundant data, the size of the audio data packet usually does not exceed that of a maximum transmission unit over a network.

Figure 4:
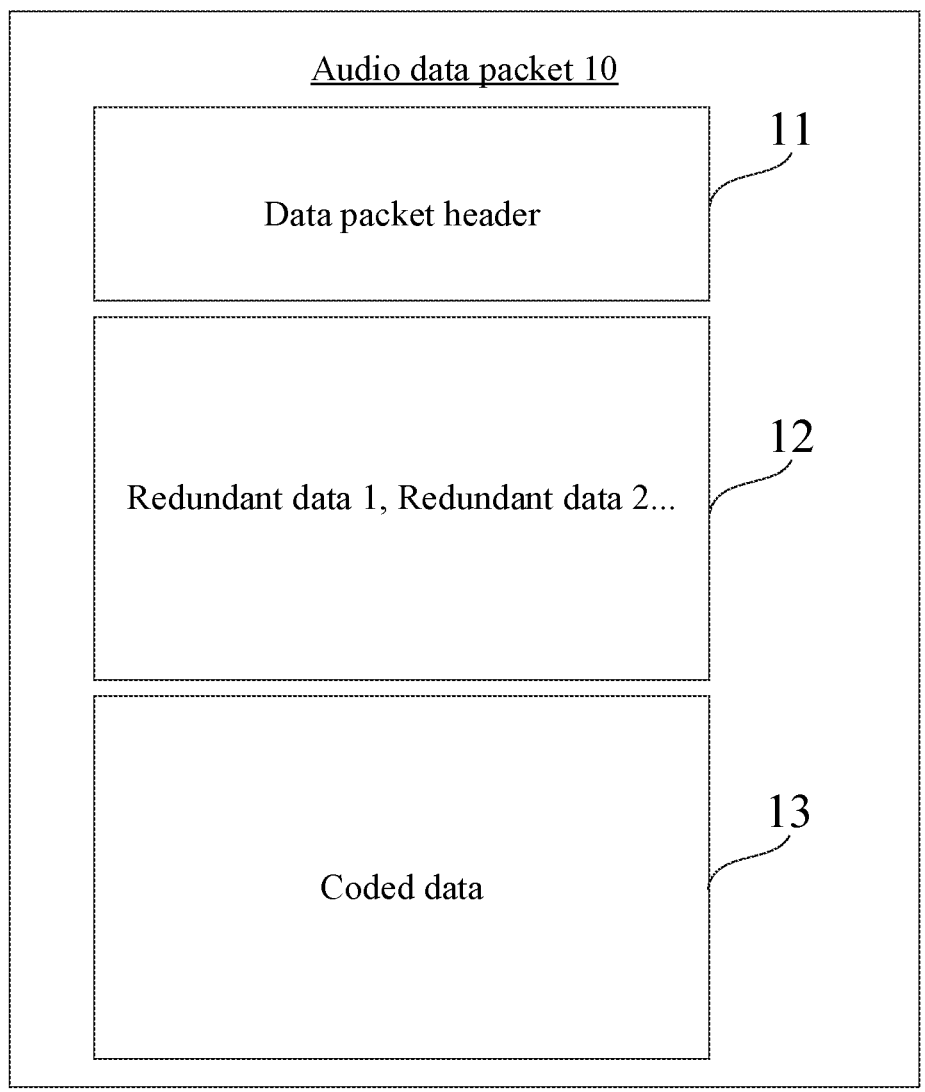
FIG. 4 is a schematic diagram of an audio data packet according to an embodiment of the present disclosure.

Referring to FIG. 4, a format of an audio data packet is schematically illustrated. As illustrated in FIG. 4, an audio data packet 10 includes a data packet header 11, redundant data 12, and coded data 13. Parameters such as a sequence number, latency, an identifier, and a timestamp of the audio data packet 10 are defined in the data packet header 11. The redundant data 12 includes definition parameters of the redundant data and a coded redundant data block. The definition parameters of the redundant data include a coding scheme, an offset value, a length of a redundant data block, and the like. The offset value is an offset of the redundant data relative to the coded data, and is, for example, a first audio frame before an audio frame corresponding to the coded data or the second audio frame before an audio frame corresponding to the coded data. Certainly, the definition parameters of the redundant data may directly include a timestamp. The timestamp of redundant data is the same as the timestamp of coded data having the same content as the redundant data. The coded data 13 includes definition parameters of the coded data and a coded data block. The definition parameters of the coded data include a coding scheme, a timestamp, and the like. As the timestamp of the coded data is the same as the timestamp of an audio data frame, the definition parameters of the coded data may not include a timestamp. Instead, the timestamp of the audio data frame is directly used as the timestamp of the coded data.

It should be noted that, if the audio data packet 10 includes more pieces of redundant data 12, each piece of the redundant data 12 separately includes definition parameters of the redundant data and a redundant data block obtained after coding the audio frame.

Figure 5:
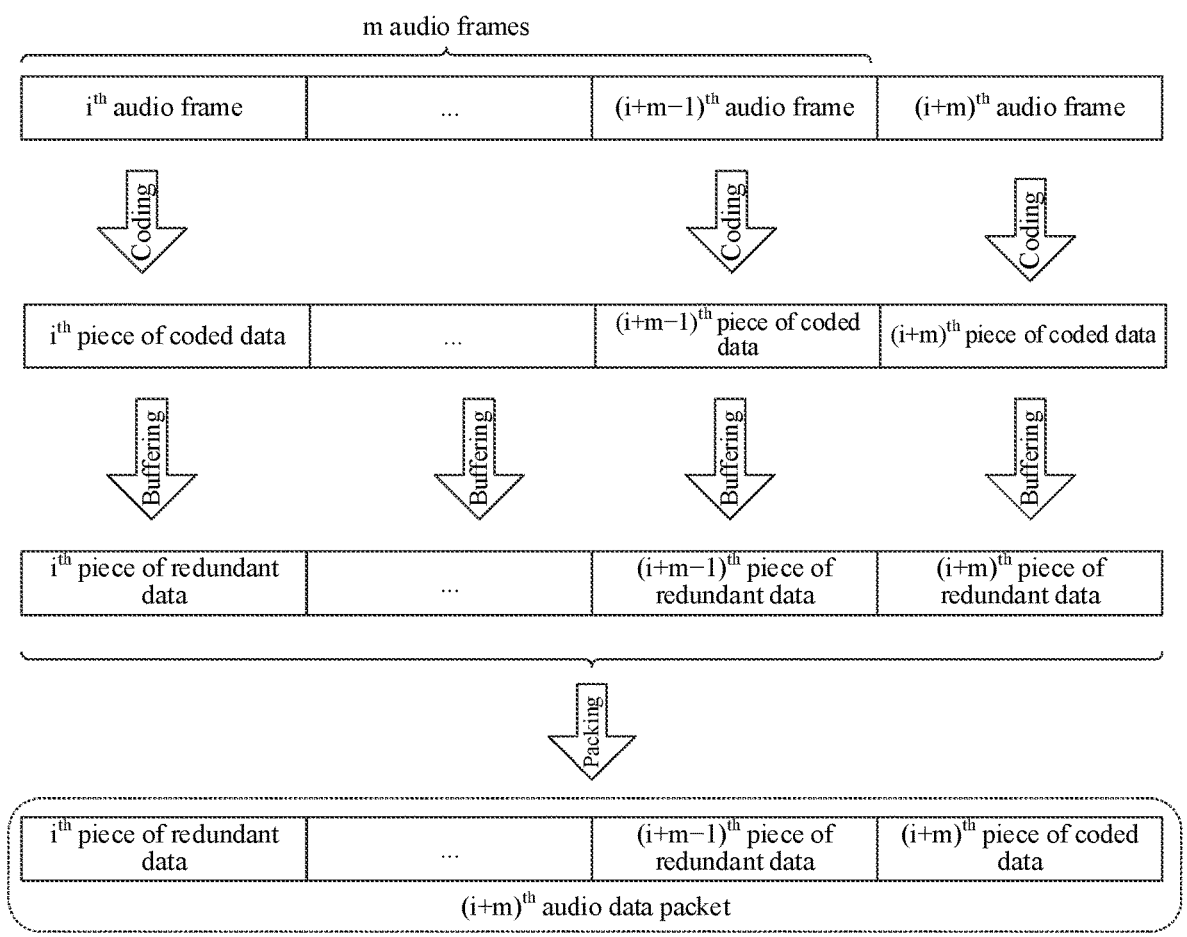
FIG. 5 is a schematic diagram of coding audio data according to an embodiment of the present disclosure.

Referring to FIG. 5, a schematic diagram of coding audio data is illustrated. As illustrated in FIG. 5, each audio frame is coded and buffered. For example, if one audio frame is coded through one coding scheme, the $i^{th}$ audio frame is coded to obtain the $i^{th}$ piece of coded data, and the $i^{th}$ piece of coded data is buffered to obtain the $i^{th}$ piece of redundant data. An $(i+m-1)^{th}$ audio frame is coded to obtain an $(i+m-1)^{th}$ piece of coded data, and the $(i+m-1)^{th}$ piece of coded data is buffered to obtain an $(i+m-1)^{th}$ piece of redundant data. An $(i+m)^{th}$ audio frame is coded to obtain an $(i+m)^{th}$ piece of coded data, and the $(i+m)^{th}$ piece of coded data is buffered to obtain an $(i+m)^{th}$ piece of redundant data. After the $(i+m)^{th}$ audio frame is coded to obtain the $(i+m)^{th}$ piece of coded data, redundant data corresponding to m previous audio frames are obtained. That is, the $i^{th}$ piece of redundant data to the $(i+m-1)^{th}$ piece of redundant data are obtained. The $i^{th}$ piece of redundant data to the $(i+m-1)^{th}$ piece of redundant data and the $(i+m)^{th}$ piece of coded data are packed into an $(i+m)^{th}$ audio data packet.

It should be noted that, step 203a to step 203c are three parallel cases. During implementation, the transmitting end determines, according to a relationship between the quantity of audio frames and m, which steps to be performed.

For example, it is assumed that a value of m is 3. For the first audio frame, the transmitting end codes the first audio frame to obtain the first piece of coded data, buffers the first piece of coded data to obtain the first piece of redundant data, and then packs the first piece of coded data into the first audio data packet. For the second audio frame, the transmitting end codes the second audio frame to obtain a second piece of coded data, buffers the second piece of coded data to obtain a second piece of redundant data, and then packs the second piece of coded data and the first piece of redundant data into the second audio data packet. For the third audio frame, the transmitting end codes the third audio frame to obtain a third piece of coded data, buffers the third piece of coded data to obtain a third piece of redundant data, and then packs the third piece of coded data, the first piece of redundant data, and the second piece of redundant data into the third audio data packet. For the fourth audio frame, the transmitting end codes the fourth audio frame to obtain a fourth piece of coded data, buffers the fourth piece of coded data to obtain a fourth piece of redundant data, and then packs the fourth piece of coded data, the first piece of redundant data, the second piece of redundant data, and the third piece of redundant data into the fourth audio data packet. For the fifth audio frame, the transmitting end codes the fifth audio frame to obtain a fifth piece of coded data, buffers the fifth piece of coded data to obtain a fifth piece of redundant data, and then packs the fifth piece of coded data, the second piece of redundant data, the third piece of redundant data, and the fourth piece of redundant data into the fifth audio data packet. The subsequent audio frames are derived similarly.

In step 204, the $i^{th}$ audio data packet is transmitted to a receiving end.

In step 205, a packet loss ratio transmitted by the receiving end is received.

The packet loss ratio is a ratio of a quantity of audio data packets that are lost or fail to be decoded to a quantity of received audio data packets that is calculated during decoding by the receiving end.

Generally, the poorer a network condition is, the higher the packet loss ratio is.

During coding, the transmitting end can receive information fed back by the receiving end, and adjust parameters related to coding according to the fed back information. In some embodiments of the present disclosure, the related parameters at least include a value of m and a coding parameter (a sampling rate and/or a compression ratio). For the adjustment of the value of m, refer to step 206. For the adjustment of the coding parameter, refer to step 207.

In step 206, a value of m is determined according to the packet loss ratio, where the value of m is positively correlated with the packet loss ratio.

In some embodiments of the present disclosure, the value of m corresponds to a redundancy level. The redundancy level is level-1 redundancy, level-2 redundancy, level-3 redundancy or the like. The higher the packet loss ratio is, the greater the value of m is, and the higher the redundancy level is.

For example, when the packet loss ratio is less than 20%, m=1, level-1 redundancy is used. When the packet loss ratio is between 20% and 40%, m=2, and level-2 redundancy is used. When the packet loss ratio is between 40% and 60%, m=3, and level-3 redundancy is used.

In some embodiments of the present disclosure, during actual application, when consecutive packets are lost, the receiving end feeds back consecutive packet loss information to the transmitting end. The transmitting end adjusts the redundancy level according to the consecutive packet loss information. The consecutive packet loss information is used to indicate the quantity of consecutive lost packets. The greater the quantity of consecutive lost packets is, the greater the value of m is, and the value of m is greater than the quantity of consecutive lost packets. For example, when three consecutive audio data packets are lost, m is adjusted to 4, and level-4 redundancy is used. When four consecutive audio data packets are lost, m is adjusted to 5, and level-5 redundancy is used.

Because coded data of the current frame and the redundant data of the m audio frames before the current frame are packed together and transmitted, if consecutive packets are lost, audio data packets received subsequently may not include redundant data of previous transmitted audio frames. As a result, lost audio frames cannot be restored. Therefore, the quantity of audio frames corresponding to redundant data needs to be increased to improve fault tolerance of audio data packets, thereby improving data reliability.

In step 207, after a current audio data packet is packed, a sampling rate and/or a compression ratio for coding subsequent audio frames is adjusted according to the packet loss ratio, where the sampling rate is positively correlated with the packet loss ratio, and the compression ratio is negatively correlated with the packet loss ratio.

In some embodiments of the present disclosure, the transmitting end may use a corresponding initial coding parameter for coding. The coding parameter includes at least one of a sampling rate and a compression ratio. The sampling rate is positively correlated with the packet loss ratio, and the compression ratio is negatively correlated with the packet loss ratio.

The greater the packet loss ratio is, the greater the sampling rate is, and the compression ratio is lower, so that coded data has a relatively low degree of distortion during restoration.

In some embodiments of the present disclosure, during actual application, only one of the sampling rate and the compression ratio may be adjusted, or both the sampling rate and the compression ratio may be adjusted.

It should be noted that both step 206 and step 207 may be performed at the same time to make adjustments, or only step 206 or 207 may be performed to make an adjustment. This is not limited in this embodiment of the present disclosure.

In some embodiments of the present disclosure, when coding schemes used by the transmitting end for coding include a first coding scheme and a second coding scheme, related parameters further include the second coding scheme. As illustrated in FIG. 3, for the adjustment of the second coding scheme, refer to step 208.

In step 208, the second coding scheme is determined according to the packet loss ratio.

For example, typical coding schemes include a G711U coding scheme, an AAC coding scheme, an opus coding scheme, and the like. The AAC coding scheme has a relatively high compression ratio. The G711U coding scheme has a relatively low compression ratio. Compared with the AAC coding scheme, the opus coding scheme has a higher compression ratio and produces coded data closer to original audio data.

If no audio data packet is lost, coded data is used to be decoded and played, and redundant data is not decoded and played. Therefore, the G711U coding scheme with a relatively low compression ratio is used for the coded data, so that the receiving end decodes audio more efficiently, and an audio frame obtained through decoding has a relatively low degree of distortion. The AAC coding scheme with a relatively high compression ratio is used for the redundant data, so that a data amount of the redundant data is minimized, thereby reducing the size of an audio data packet to facilitate the transmission of the audio data packet.

When the packet loss ratio is relatively high, it is indicated that the redundant data is more likely to be used for decoding, and the second coding scheme is therefore adjusted to a coding scheme with a lower degree of distortion. For example, the AAC coding scheme is adjusted to the opus coding scheme. In some embodiments of the present disclosure, during actual application, a packet loss ratio threshold may be set. When the packet loss ratio received by the transmitting end reaches the packet loss ratio threshold, the transmitting end adjusts the second coding scheme.

In some embodiments of the present disclosure, during actual application, if the transmitting end uses one coding scheme, one coder is started to perform coding. If the transmitting end uses a plurality of coding schemes, a plurality of coders are started to perform coding. Each coder corresponds to one coding scheme.

In some embodiments of the present disclosure, the transmitting end and the receiving end may use a Session Description Protocol (SDP) to negotiate a supported audio coding and decoding capability. The audio coding and decoding capability herein includes at least one of a coding parameter, a coding scheme, and a redundancy level. The transmitting end selects a coding scheme, a coding parameter or a redundancy level according to the audio coding and decoding capability supported by the receiving end.

It should be noted that, step 206, step 207, and step 208 may all be adjusted at the same time, or only one of step 206, step 207, and step 208 may be adjusted, or any two of step 206, step 207, and step 208 may be adjusted. In addition, step 205 to step 208 may be performed at any moment during coding, and are not necessarily performed after step 204.

In some embodiments of the present disclosure, the transmitting end may adjust any one, any two, any three or all the value of m, the sampling rate, the packet loss ratio, and the second coding scheme according to the packet loss ratio.

In summary, in the audio coding method according to embodiments of the present disclosure, an $i^{th}$ audio frame is coded to obtain an $i^{th}$ piece of coded data, and the $i^{th}$ piece of coded data is buffered to obtain an $i^{th}$ piece of redundant data. During packing an audio data packet, the $i^{th}$ piece of coded data and at most m pieces of redundant data before the $i^{th}$ piece of redundant data are packed into an $i^{th}$ audio data packet. The $i^{th}$ audio data packet is transmitted to a receiving end. Therefore, when the $i^{th}$ audio data packet is lost or the $i^{th}$ piece of coded data fails to be decoded, the receiving end may obtain the last piece of redundant data corresponding to the $i^{th}$ piece of coded data in a next audio data packet of the $i^{th}$ audio data packet. The receiving end decodes the last piece of redundant data to obtain the $i^{th}$ audio frame. Because coded data of the current frame and redundant data of one or more previous frames are transmitted together, if the current frame is lost, redundant data in a next audio data packet can be used to restore a lost audio frame as soon as possible, and the lost audio frame can be restored without waiting for a redundant data packet following a group of compressed data packets, thereby reducing latency caused by loss of an audio data packet.

For step 205 to step 208, because the transmitting end receives the packet loss ratio fed back by the transmitting end during coding, and adjusts, according to the packet loss ratio, the value of m or the sampling rate or the compression ratio for coding or the used second coding scheme, so that the transmitting end can adaptively adjust a coding parameter or a coding scheme according to an actual transmission condition of audio data packets during network transmission.

Figure 6:
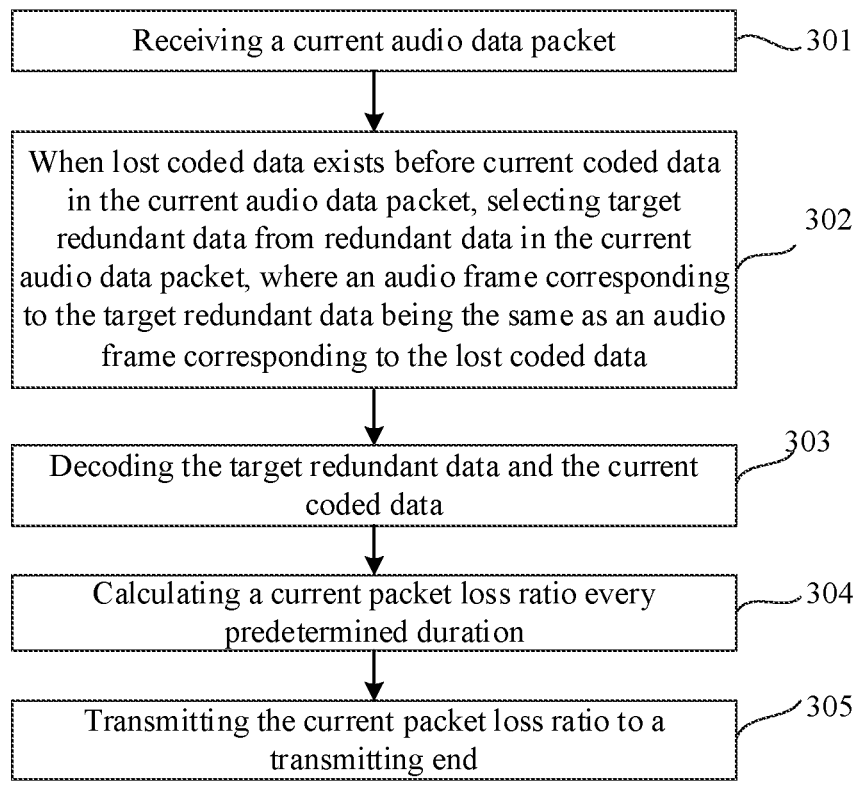
FIG. 6 is a flowchart of an audio decoding method according to an embodiment of the present disclosure.

FIG. 6 is a flowchart of an audio decoding method according to an embodiment of the present disclosure. For example, the audio decoding method is applicable to the receiving end 120 illustrated in FIG. 1. As illustrated in FIG. 6, the audio decoding method may include the following steps:

In step 301, a current audio data packet is received.

A transmitting end sequentially transmits audio data packets to a receiving end. The receiving end receives the audio data packets transmitted by the transmitting end. The current audio data packet is an audio data packet currently received by the receiving end. The current audio data packet may be any audio data packet transmitted by the transmitting end.

In this embodiment of the present disclosure, if the current audio data packet is the first audio data packet transmitted by the transmitting end, the first audio data packet includes the first piece of coded data. The first piece of coded data is obtained by coding the first audio frame. If the current audio data packet is an $i^{th}$ (i>1) audio data packet transmitted by the transmitting end, an $i^{th}$ piece of coded data packet includes the $i^{th}$ piece of coded data and at least one piece of redundant data. It is assumed that a maximum number of pieces of redundant data added by the transmitting end to an audio data packet is m, where m is a preset positive integer. When 1<i≤m, an $i^{th}$ audio data packet includes the $i^{th}$ piece of coded data and (i−1) pieces of redundant data before an $i^{th}$ piece of redundant data. When m<i≤n, the $i^{th}$ audio data packet includes the $i^{th}$ piece of coded data and an $(i-m)^{th}$ piece of redundant data to an $(i-1)^{th}$ piece of redundant data. The $i^{th}$ piece of redundant data is obtained by coding an $i^{th}$ audio frame.

In step 302, when lost coded data exists before current coded data in the current audio data packet, target redundant data is selected from redundant data in the current audio data packet, where an audio frame corresponding to the target redundant data is the same as an audio frame corresponding to the lost coded data.

As the transmitting end transmits audio data packets to the receiving end, an audio data packet may be lost. As a result, the receiving end cannot receive one or more audio data packets. Therefore, after the receiving end receives the current audio data packet, it needs to be determined whether lost coded data exists before the current coded data in the current audio data packet. For example, a process of the foregoing determining includes several possible implementations as follows:

In a possible implementation, when the timestamp of the current coded data and the timestamp of received coded data are not consecutive, it is determined that lost coded data exists before the current coded data.

If no packet is lost, the timestamp of the current coded data received by the receiving end and the timestamp of received coded data should be consecutive. For example, the timestamps of respective pieces of received coded data are sequentially 1, 2, and 3. The timestamp of a next piece of coded data should be 4. If the timestamp of the current coded data received by the receiving end is 4, it is determined that no lost coded data exists before the current coded data. If the timestamp of the current coded data received by the receiving end is 5, it is determined that lost coded data exists before the current coded data. That is, the piece of coded data with a timestamp of 4 is lost.

In another possible implementation, in redundant data included in the current audio data packet, when there are redundant data with a timestamp that is different to the timestamp of the received coded data, it is determined that there are coded data before the current coded data lost.

If no packet is lost, in the redundant data included in the current audio data packet received by the receiving end, the timestamp of each piece of redundant data is identical to the timestamp of each received coded data. For example, the timestamps of respectivec pieces of received coded data are sequentially 1, 2, and 3. It is assumed that each audio data packet carries at most two pieces of redundant data. In this case, a next audio data packet should carry a piece of coded data with a timestamp of 4, a piece of redundant data with a timestamp of 2, and a piece of redundant data with a timestamp of 3. If the current audio data packet received by the receiving end includes the piece of coded data with a timestamp of 4, the piece of redundant data with a timestamp of 2, and the piece of redundant data with a timestamp of 3, it is determined that no coded data before the current coded data is lost. If the current audio data packet received by the receiving end includes a piece of coded data with a timestamp of 5, the piece of redundant data with a timestamp of 3, and the piece of redundant data with a timestamp of 4, because the timestamp 4 is different to the timestamp of the received coded data, it is determined that coded data before the current coded data is lost. That is, a piece of coded data with a timestamp of 4 is lost.

In still another possible implementation, when the timestamp of the current coded data and the timestamp of the received coded data are not consecutive, it further needs to be determined whether redundant data corresponding to unreceived coded data exists in the received redundant data. If the redundant data corresponding to the unreceived coded data exists, it indicates that the unreceived coded data may be obtained by using the redundant data corresponding to the unreceived coded data in the received redundant data, it is determined that the unreceived coded data is not lost, and it is not necessary to decode the redundant data in the current audio data packet. If the redundant data corresponding to the unreceived coded data does not exist, it indicates that the coded data is lost. For example, as discussed above, the piece of coded data with a timestamp of 4 is not received, the received redundant data is pieces of redundant data with timestamps of 2 and 3, and the piece of redundant data with a timestamp of 4 does not exist. In this case, it indicates that the piece of coded data with a timestamp of 4 is lost.

It should be noted that, if each audio data packet includes only one piece of redundant data, when the timestamp of the current coded data and the timestamp of received coded data are not consecutive, it may be determined that lost coded data exists before the current coded data.

In addition, in another possible implementation, it may be separately determined whether the timestamp of the current coded data and the timestamp of the received coded data or the timestamp of the received redundant data are consecutive. When the timestamp of the current coded data and the timestamp of the received coded data or the timestamp of the current coded data and the timestamp of the received redundant data are not consecutive, it is determined that lost coded data exists before the current coded data.

In addition, the receiving end may further determine an interval between the timestamps of two adjacent pieces of coded data (or redundant data) according to a frame rate, to determine whether the timestamps of the two pieces of coded data (or redundant data) are consecutive. For example, if a difference between the timestamps of the two pieces of coded data (or redundant data) is equal to the foregoing interval, the timestamps are consecutive. If the difference between the timestamps of the two pieces of coded data (or redundant data) is not equal to foregoing interval, the timestamps are not consecutive.

When it is determined that lost coded data exists before the current coded data in the current audio data packet, the receiving end selects the target redundant data from redundant data in the current audio data packet, wherein an audio frame corresponding to the target redundant data is the same as an audio frame corresponding to the lost coded data. That is, the timestamp corresponding to the target redundant data is the same as the timestamp corresponding to the lost coded data.

In a possible implementation, the receiving end selects, according to the timestamp of redundant data in the current audio data packet, redundant data with a timestamp that is different from the timestamp of the received coded data as the target redundant data. Still, the foregoing example is used. The timestamps of respective pieces of received coded data are sequentially 1, 2, and 3. If the current audio data packet received by the receiving end includes a piece of coded data with a timestamp of 5, a piece of redundant data with a timestamp of 3, and a piece of redundant data with a timestamp of 4, the receiving end uses the piece of redundant data with a timestamp of 4 as the target redundant data. This manner is applicable to a case in which a single audio data packet includes one piece of redundant data. It should be noted that, in this manner, redundant data in different audio data packets have different timestamps. Therefore, the timestamp of the target redundant data selected from the current audio data packet is different from the timestamp of received redundant data before the current audio data packet.

In another possible implementation, the receiving end selects, according to the timestamp of the redundant data in the current audio data packet, redundant data with a timestamp that is different from the timestamp of the received coded data or the timestamp of the received redundant data as the target redundant data. This manner is applicable to a case in which a single audio data packet includes at least two pieces of redundant data. There may be one or more pieces of target redundant data, and the quantity of pieces of target redundant data is determined by an actual quantity of pieces of lost coded data.

In this embodiment, the timestamp of redundant data may be directly carried in definition parameters of the redundant data, or may be calculated according to an offset value corresponding to the redundant data and the timestamp of coded data in a same audio data packet as the redundant data.

In step 303, the target redundant data and the current coded data are decoded.

In some embodiments of the present disclosure, the receiving end sorts the target redundant data and the current coded data according to the timestamp of the target redundant data and the timestamp of the current coded data, wherein the quantity of pieces of target redundant data is w, and w is a positive integer. Next, the receiving end sequentially decodes the target redundant data and the current coded data in ascending order of timestamps, to obtain (w+1) audio frames.

For example, the timestamp of the current coded data is 5, the quantity of pieces of target redundant data is 2, the timestamp of one piece of target redundant data is 3, and the timestamp of the other piece of target redundant data is 4. In this case, the receiving end sorts the foregoing data in ascending order of timestamps. The sorted data is sequentially a piece of redundant data with a timestamp of 3, a piece of redundant data with a timestamp of 4, and a piece of coded data with a timestamp of 5. Subsequently, the receiving end sequentially decodes the foregoing data in ascending order of timestamps to obtain three audio frames.

In the foregoing manner, through sorting the coded data in ascending order of timestamps and decoding, it can be ensured that audio frames obtained after decoding can be played properly.

In some embodiments of the present disclosure, the method according to this embodiment further includes the following step:

In step 304, a current packet loss ratio is calculated every predetermined duration.

During decoding by the receiving end, the current packet loss ratio is calculated once every predetermined duration. For example, a ratio of the quantity of currently lost data packets to a number of transmitted data packets is calculated once every 1 second.

In step 305, the current packet loss ratio is transmitted to a transmitting end.

After calculating the packet loss ratio, the receiving end transmits the packet loss ratio to the transmitting end in real time, so that the transmitting end can adjust, according to the packet loss ratio, at least one of a value of m, a sampling rate for coding, a compression ratio for coding, and a second coding scheme.

In some embodiments of the present disclosure, the packet loss ratio may be transmitted by the receiving end to the transmitting end through the standard Real-time Transport Protocol (RTP) Control Protocol (RTCP).

In some embodiments of the present disclosure, if consecutive packets are lost, the receiving end may set a predetermined threshold, when the quantity of consecutive lost packets reaches the predetermined threshold, the receiving end transmits consecutive packet loss information to the transmitting end. The transmitting end may further adjust at least one of the value of m, a sampling rate for coding, a compression ratio for coding, and a second coding scheme according to the consecutive packet loss information.

It should be noted that, step 304 and step 305 may be performed once every predetermined duration after decoding is started, but are not necessarily performed after step 303.

In summary, in the audio decoding method provided in this embodiment of the present disclosure, when it is determined that lost coded data exists before current coded data in a current audio data packet, target redundant data is selected from redundant data in the current audio data packet. Next, the target redundant data and the current coded data are decoded. Because coded data of a current frame and redundant data of one or more previous frames are transmitted together, if the current frame is lost, redundant data in a next audio data packet can be used to restore a lost audio frame as soon as possible, and the lost audio frame can be restored without waiting for a redundant data packet following a group of compressed data packets, thereby reducing latency caused by loss of an audio data packet.

In step 304 and step 305, the receiving end calculates the current packet loss ratio every predetermined duration, and feeds back the packet loss ratio to the transmitting end, so that the transmitting end can adjust, according to the packet loss ratio, at least one of the value of m, the sampling rate for coding, the compression ratio for coding, and the second coding scheme, and the transmitting end can adaptively adjust a coding parameter or a coding scheme according to an actual transmission condition of audio data packets during network transmission.

Figure 7:
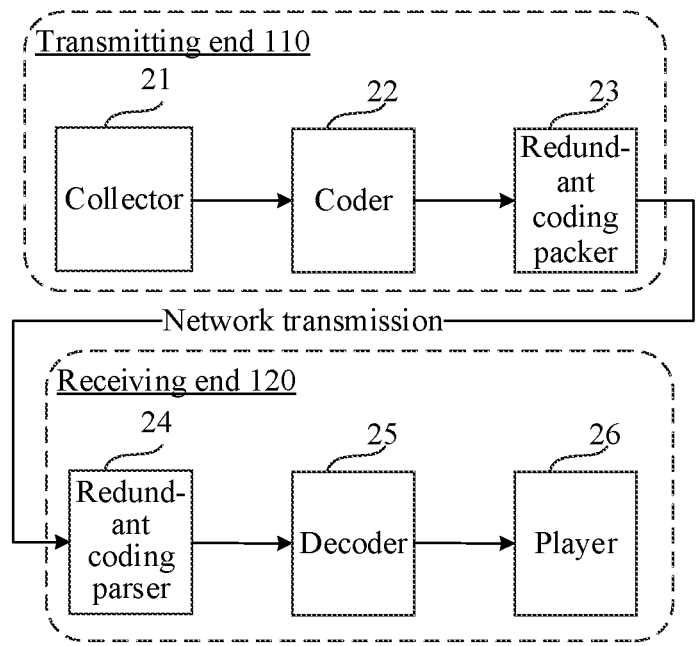
FIG. 7 is a schematic diagram of transmitting audio data according to an embodiment of the present disclosure.

Referring to FIG. 7, a schematic diagram of transmitting audio data is illustrated. As illustrated in FIG. 7, a sound signal is processed by a collector 21, a coder 22, and a redundant coding packer 23 in the transmitting end 110.

Audio data packets are then transmitted to the receiving end 120 through a network. The audio data packets are processed by a redundant coding parser 24, a decoder 25, and a player 26 in the receiving end 120. The sound signal is eventually played by the receiving end.

Figure 8:
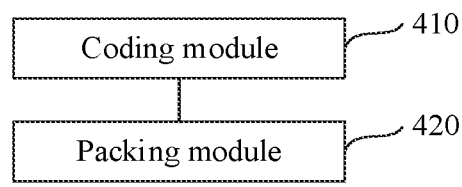
FIG. 8 is a structural block diagram of an audio coding device according to an embodiment of the present disclosure.

FIG. 8 is a structural block diagram of an audio coding device provided by an embodiment of the present disclosure. The audio coding device is described by the application of the audio coding device in the transmitting end 110 illustrated in FIG. 1. As illustrated in FIG. 8, the audio coding device may include a coding module 410 and a packing module 420.

The coding module 410 is configured to obtain an $i^{th}$ audio frame in n consecutive audio frames and obtain an $i^{th}$ piece of coded data and an $i^{th}$ piece of redundant data based on the $i^{th}$ audio frame, where the $i^{th}$ piece of coded data is obtained by coding the $i^{th}$ audio frame, and the $i^{th}$ piece of redundant data is obtained by coding and buffering the $i^{th}$ audio frame, where i is a positive integer, n is a positive integer, and $1 \leq i \leq n$.

The packing module 420 is configured to pack the $i^{th}$ piece of coded data and at most m pieces of redundant data before the $i^{th}$ piece of redundant data which are obtained by the coding module into an $i^{th}$ audio data packet, where m is a preset positive integer.

In some embodiments of the present disclosure, the packing module 420 includes:

a first packing unit configured to pack the first piece of coded data into the first audio data packet when i=1;

a second packing unit configured to pack the $i^{th}$ piece of coded data and (i−1) pieces of redundant data before the buffered $i^{th}$ piece of redundant data into the $i^{th}$ audio data packet when $1 \leq i \leq m$; and a third packing unit configured to pack the $i^{th}$ piece of coded data and a buffered $(i-m)^{th}$ piece of redundant data to a buffered $(i-1)^{th}$ piece of redundant data into the $i^{th}$ audio data packet when $m < i \leq n$.

In some embodiments of the present disclosure, the audio coding device further includes:

a first receiving module configured to receive a packet loss ratio transmitted by a receiving end; and a first determining module configured to determine a value of m according to the packet loss ratio received by the first receiving module, where the value of m is positively correlated with the packet loss ratio.

In some embodiments of the present disclosure, the device further includes:

a second receiving module configured to receive a packet loss ratio transmitted by a receiving end; and an adjusting module configured to, after a current audio data packet is packed, adjust, according to a packet loss ratio received by the second receiving module, a sampling rate and/or a compression ratio of subsequent audio frames for coding, where the sampling rate is positively correlated with the packet loss ratio, and the compression ratio is negatively correlated with the packet loss ratio In some embodiments of the present disclosure, the coding module 410 includes:

a first coding unit configured to code the $i^{th}$ audio frame through a first coding scheme to obtain an $i^{th}$ piece of first coded data;

a second coding unit configured to code the $i^{th}$ audio frame through a second coding scheme to obtain an $i^{th}$ piece of second coded data; and a buffering unit configured to buffer the $i^{th}$ piece of second coded data obtained by the second coding unit as the $i^{th}$ piece of redundant data.

In some embodiments of the present disclosure, the coding module 410 is configured to obtain the $i^{th}$ piece of coded data by coding the $i^{th}$ audio frame, and obtain the $i^{th}$ piece of redundant data by buffering the $i^{th}$ piece of coded data.

In some embodiments of the present disclosure, the device further includes:

a third receiving module configured to receive a packet loss ratio transmitted by a receiving end; and a second determining module configured to determine the second coding scheme according to the packet loss ratio received by the third receiving module.

In some embodiments of the present disclosure, the device further includes:

a collecting module configured to collect a sound signal to obtain source audio data, where the source audio data includes the n consecutive audio frames.

In summary, in the audio coding device according to the embodiments of the present disclosure, an $i^{th}$ audio frame is coded to obtain an $i^{th}$ piece of coded data, and the $i^{th}$ piece of coded data is buffered to obtain an $i^{th}$ piece of redundant data. During the packing of an audio data packet, the $i^{th}$ piece of coded data and at most m pieces of redundant data before the $i^{th}$ piece of redundant data are packed into an $i^{th}$ audio data packet. The $i^{th}$ audio data packet is transmitted to a receiving end. Therefore, when the $i^{th}$ audio data packet is lost or the $i^{th}$ piece of coded data fails to be decoded, the receiving end may obtain the last piece of redundant data corresponding to the $i^{th}$ piece of coded data in a next audio data packet of the $i^{th}$ audio data packet. The receiving end decodes the last piece of redundant data to obtain the $i^{th}$ audio frame. Because coded data of a current frame and redundant data of one or more previous frames are transmitted together, if the current frame is lost, redundant data in a next audio data packet can be used to restore a lost audio frame as soon as possible, and the lost audio frame can be restored without waiting for a redundant data packet following a group of compressed data packets, thereby reducing latency caused by loss of an audio data packet.

The transmitting end receives the packet loss ratio fed back by the transmitting end during coding, and adjusts, according to the packet loss ratio, the value of m or the sampling rate or the compression ratio for coding or the used second coding scheme, so that the transmitting end can adaptively adjust coding parameters or a coding scheme according to an actual transmission condition of audio data packets during network transmission.

Figure 9:
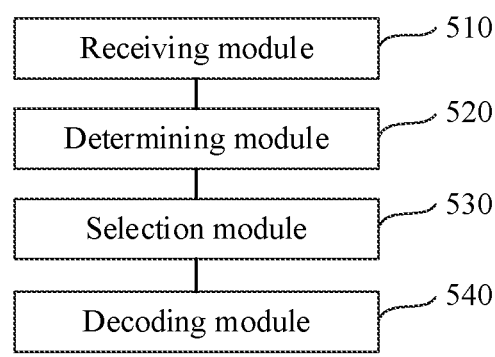
FIG. 9 is a structural block diagram of an audio decoding device according to an embodiment of the present disclosure.

FIG. 9 is a structural block diagram of an audio decoding device according to an embodiment of the present disclosure. For example, the audio decoding device described by application of the audio decoding device in the receiving end 120 illustrated in FIG. 1. As illustrated in FIG. 9, the audio decoding device may include a receiving module 510, a determining module 520, a selection module 530, and a decoding module 540.

The receiving module 510 is configured to receive a current audio data packet.

The determining module 520 is configured to determine whether lost coded data exists before current coded data in the current audio data packet received by the receiving module 510.

The selection module 530 is configured to, when the determining module 520 determines that lost coded data exists before the current coded data in the current audio data packet, select target redundant data from redundant data in the current audio data packet, where an audio frame corresponding to the target redundant data is the same as an audio frame corresponding to the lost coded data.

The decoding module 540 is configured to decode the target redundant data and the current coded data.

In some embodiments of the present disclosure, the determining module 520 is configured to, when the timestamp of the current coded data and the timestamp of the received coded data are not consecutive, determine that lost coded data exists before the current coded data.

In some embodiments of the present disclosure, the determining module 520 is further configured to, when the timestamp of the current coded data is different from a timestamp of the received redundant data or the timestamp of the current coded data and the timestamp of the received coded data are not consecutive, determine that an audio frame before the current coded data is lost.

In some embodiments of the present disclosure, the selection module 530 is configured to select, according to the timestamp of the redundant data in the current audio data packet, redundant data with a timestamp that is different from a timestamp of the received coded data as the target redundant data.

In some embodiments of the present disclosure, the decoding module 540 includes:

a sorting unit configured to sort the target redundant data and the current coded data according to the timestamp of the target redundant data and the timestamp of the current coded data, where the quantity of pieces of target redundant data is w, and w is a positive integer; and a decoding unit configured to sequentially decode the target redundant data and the current coded data in ascending order of timestamps, to obtain (w+1) audio frames.

In some embodiments of the present disclosure, the transmitting end codes a current audio frame through a first coding scheme and a second coding scheme, respectively, wherein the first coding scheme is used to code the current audio frame to obtain the current coded data and the second coding scheme is used to code the current audio frame to obtain a current piece of redundant data.

The device further includes:

a calculation module configured to calculate a current packet loss ratio every predetermined duration; and a transmitting module configured to transmit the current packet loss ratio to the transmitting end.

The packet loss ratio is used to determine at least one of the following parameters:

a value of a maximum number m of pieces of redundant data added to the current audio data packet, a sampling rate for coding, a compression ratio for coding, and a second coding scheme, where the value of m is positively correlated with the packet loss ratio, the sampling rate is positively correlated with the packet loss ratio, and the compression ratio is negatively correlated with the packet loss ratio.

In summary, in the audio decoding device according to this embodiment of the present disclosure, when it is determined that coded data before current coded data in the current audio data packet is lost, target redundant data is selected from redundant data in the current audio data packet. Next, the target redundant data and the current coded data are decoded. Because coded data of a current frame and redundant data of one or more previous frames are transmitted together, if an audio data packet is lost, redundant data in a next audio data packet can be used to restore the lost audio data packet as soon as possible, and the lost audio data packet can be restored without waiting for a redundant data packet following a group of compressed data packets, thereby reducing latency caused by loss of an audio data packet.

The receiving end calculates the current packet loss ratio every predetermined duration, and feeds back the packet loss ratio to the transmitting end, so that the transmitting end can adjust, according to the packet loss ratio, at least one of the value of m, the sampling rate for coding, the compression ratio for coding, and the second coding scheme, and the transmitting end can adaptively adjust coding parameters or a coding scheme according to an actual transmission condition of audio data packets during network transmission.

Figure 10:
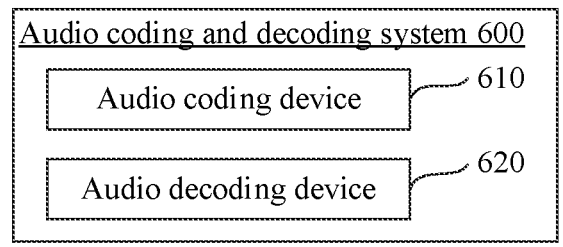
FIG. 10 is a structural block diagram of an audio coding-decoding system according to an embodiment of the present disclosure.

FIG. 10 is a structural block diagram of an audio coding and decoding system according to an embodiment of the present disclosure. An audio coding and decoding system 600 includes an audio coding device 610 and an audio decoding device 620.

The audio coding device 610 is the audio coding device according to the embodiment as illustrated in FIG. 8, and the audio decoding device 620 is the audio decoding device according to the embodiment as illustrated in FIG. 9.

The audio coding device 610 may be a coder or a transmitting end device having a coder, and the audio decoding device may be a decoder or a receiving end device having a decoder.

It should be noted that the devices provided by the embodiments only take division of all the functional modules when realizing their functions as an example for explanation. During actual application, the above functions can be completed by different functional modules as required. That is, the internal structure of the device is divided into different functional modules to complete all or part of the functions described above. In addition, the devices provided by the present embodiments have the same concept as the methods provided by the foregoing embodiments. Refer to the method embodiments for the specific implementation process of the devices, which will not be repeated herein.

An exemplary embodiment further provides a computer-readable storage medium storing at least one instruction, which may be loaded and executed by a processor to implement the audio coding method described in FIG. 2 or 3.

An exemplary embodiment further provides a computer-readable storage medium storing at least one instruction, which may be loaded and executed by a processor to implement the audio decoding method described in FIG. 6.

An exemplary embodiment further provides a computer device including a processor and a memory. The memory stores at least one instruction, which may be loaded and executed by the processor to implement the audio coding method described in FIG. 2 or 3.

An exemplary embodiment further provides a computer device including a processor and a memory. The memory stores at least one instruction, which may be loaded and executed by the processor to implement the audio decoding method described in FIG. 6.

Figure 11:
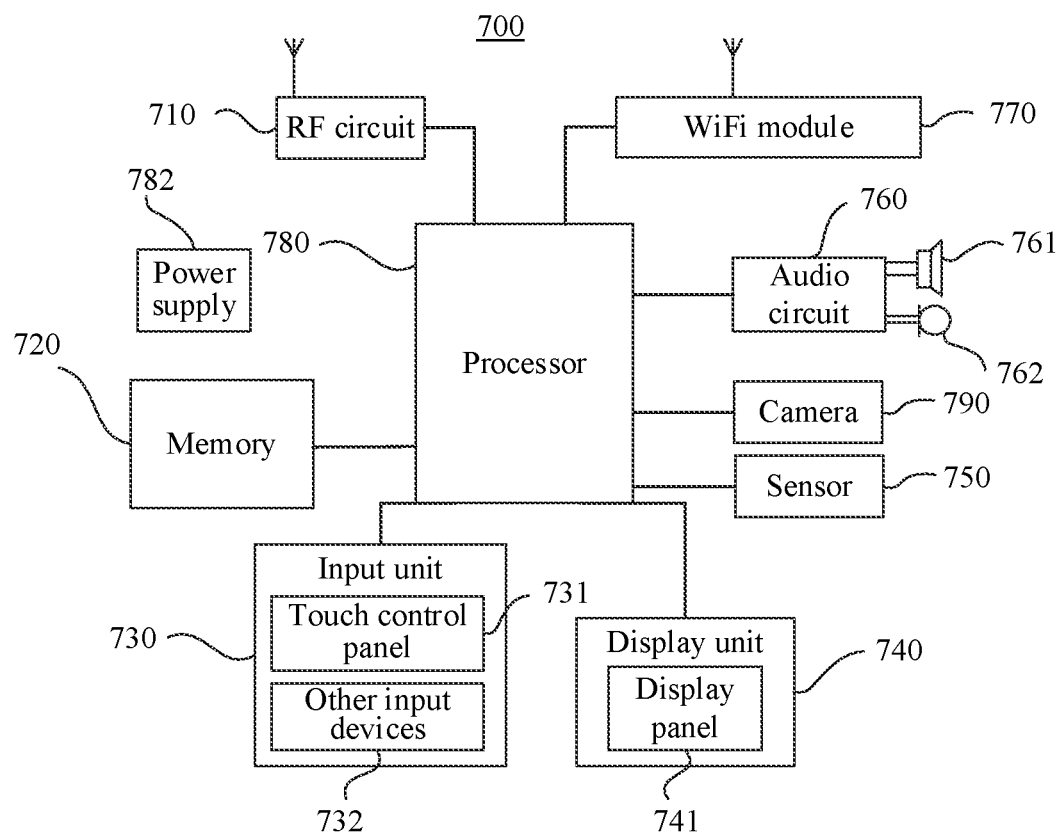
FIG. 11 is a structural block diagram of a terminal according to an embodiment of the present disclosure.

FIG. 11 is a structural block diagram of a terminal according to some embodiments of the present disclosure. The terminal 700 may be the transmitting end 110 illustrated in FIG. 1 or the receiving end 120 illustrated in FIG. 1, and may be configured to implement the audio coding or decoding methods in the foregoing embodiments. The terminal 700 in the present disclosure may include one or more of the following components: a processor for executing computer program instructions to complete various flows and methods, a random access memory (RAM) for storing information and program instructions, a read-only memory (ROM) for storing data and information, an I/O device, an interface, an antenna and the like. Specifically:

The terminal 700 may include a radio frequency (RF) circuit 710, a memory 720, an input unit 730, a display unit 740, a sensor 750, an audio circuit 760, a wireless fidelity (WiFi) module 770, a processor 780, a power supply 782, a camera 790 etc. It can be understood by those skilled in the art that the terminal structure illustrated in FIG. 11 is not a limitation to the terminal. The terminal may include more or fewer components than those in FIG. 11, a combination of some components or different component layouts.

The components of the terminal 700 will be introduced in detail with reference to FIG. 11.

The RF circuit 710 may be configured to receive and send messages or to receive and send a signal during a call, in particular, to hand over downlink information received from a base station to one or more processors 780 for processing, and furthermore, to transmit uplink data to the base station. Usually, the RF circuit includes but not limited to an antenna, at least one amplifier, a transceiver, a coupler, a low noise amplifier (LNA), a duplexer, etc. Besides, the RF circuit 710 may further communicate with a network and other devices through radio communication which may use any communication standard or protocol, including but not limited to global system of mobile communications (GSM), general packet radio service (GPRS), code division multiple access (CDMA), wideband code division multiple access (WCDMA), long term evolution (LTE), e-mails, and short messaging service (SMS).

The memory 720 can be configured to store software programs and modules. The processor 780 executes various functional applications and performs data processing of the terminal 700 by running software programs and modules stored in the memory 720. The memory 720 may mainly include a program storage area and a data storage area. The program storage area may store an operating system, an application required by at least one function (such as a sound playing function and an image playing function), and the like. The data storage data area may store data (such as audio data and contacts) created according to the use of the terminal 700. In addition, the memory 720 may include a high-speed RAM and may further include a non-volatile memory, such as at least one magnetic disk storage device, a flash memory device, or other volatile solid-state memory devices.

The input unit 730 may be configured to receive input alphanumeric information and to generate key signal inputs related to user settings and functional control of the terminal 700. In particular, the input unit 730 may include a touch control panel 731 and other input devices 732. The touch control panel 731 is also called a touch screen, can collect touch operations on or near the touch control panel 731 by a user (for example, operations on or near the touch control panel 731 by the user with any an appropriate object or accessory like a finger, a stylus or the like) and can also drive a correspondingly connected device based on a preset driver. In some embodiments of the present disclosure, the touch control panel 731 may include two portions, namely a touch detection device and a touch controller. The touch detection device detects a touch position of the user and a signal generated by a touch operation, and transmits the signal to the touch controller. The touch controller receives the touch information from the touch detection device, converts the received touch information into contact coordinates, sends the contact coordinates to the processor 780 and can receive and execute a command sent by the processor 780. In addition, the touch control panel 731 can be realized in various forms including resistance, capacitance, infrared rays, surface acoustic waves, etc. In addition to the touch control panel 731, the input unit 730 may further include the other input devices 732. In particular, these other input devices 732 may include but not limited to one or more of a physical keyboard, functional keys (such as a volume control key and a switch key), a trackball, a mouse, a joystick, etc.

The display unit 740 may be configured to display information input by the user or provide information and various menus of the terminal 700 for the user. The display unit 740 may include a display panel 741. In some embodiments of the present disclosure, such forms as a liquid crystal display (LCD) and an organic light-emitting diode (OLED) may be adopted to configure the display panel 741. Further, the touch control panel 731 may cover the display panel 741. The touch control panel 731 transmits a detected touch operation on or near itself to the processor 780 to determine the type of a touch event. Subsequently, the processor 780 provides a corresponding visual output on the display panel 741 based on the type of the touch event. Although the touch control panel 731 and the display panel 741 in FIG. 11 are two independent components for achieving input and output functions, in some embodiments, the touch control panel 731 and the display panel 741 may be integrated to achieve the input and output functions.

The terminal 700 may further include at least one sensor 750, such as a gyro sensor, a magnetic induction sensor, a photosensor, a motion sensor and other sensors. In particular, the photosensor may include an ambient light sensor and a proximity sensor. The ambient light sensor can adjust the luminance of the display panel 741 based on the intensity of ambient light. The proximity sensor may turn off the display panel 741 and/or a backlight when the terminal 700 moves to an ear. As one of the motion sensors, a gravity acceleration sensor may detect accelerations in all directions (typically, three axes), may also detect the magnitude and the direction of gravity when the terminal is stationary, and may be applied to mobile phone attitude recognition applications (such as portrait and landscape switching, related games and magnetometer attitude correction), relevant functions of vibration recognition (such as a pedometer and knocking), etc. Other sensors such as a barometer, a hygrometer, a thermometer and an infrared sensor, which can be provided to the terminal 700, will not be repeated herein.

The audio circuit 760, a speaker 761, and a microphone 762 may provide an audio interface between the user and the terminal 700. On one hand, the audio circuit 760 may transmit an electrical signal converted from the received audio data to the speaker 761, and the electrical signal is converted by the speaker 761 into an acoustical signal for outputting. On the other hand, the microphone 762 converts the collected acoustical signal into an electrical signal, the audio circuit 760 receives the electrical signal, converts the received electrical signal into audio data, and outputs the audio data to the processor 780 for processing, and the processed audio data are transmitted to another terminal by the RF circuit 710. Alternatively, the audio data are output to the memory 720 for further processing.

WiFi is a short-range wireless transmission technology, and the terminal 700 can help the user to send and receive emails, browse web pages, and access streaming media by the WiFi module 770, thereby providing wireless broadband Internet access for the users. Although FIG. 11 shows the WiFi module 770, it can be understood that the WiFi module 770 does not belong to the essential configuration of the terminal 700, and may be omitted as needed while not changing the essence of the disclosure.

The processor 780 is a control center of the terminal 700, connects all portions of an entire terminal through various interfaces and circuits. By running or executing the software programs and/or the modules stored in the memory 720 and invoking data stored in the memory 720, the processor 780 executes various functions of the terminal 700 and processes the data so as to wholly monitor the terminal 700. In some embodiments of the present disclosure, the processor 780 may include one or more processing units. Preferably, the processor 780 may be integrated with an application processor and a modem processor. The application processor is mainly configured to process an operation system, user interfaces, application programs, etc. The modem processor is mainly configured to process radio communication. It can be understand that the modem processor may not be integrated with the processor 780.

The terminal 700 may further include the power supply 782 (for example, a battery) for supplying power to all the components. For example, the power supply is logically connected to the processor 780 through a power management system to manage charging, discharging, power consumption, and the like through the power management system.

The camera 790 typically includes a lens, an image sensor, an interface, a digital signal processor, a central processing unit (CPU), a display screen and the like. The lens is fixed above the image sensor, and the focus may be changed by a manually adjustable lens. The image sensor is equivalent to a "film" of a conventional camera and is an essential component of the camera for image collection. The interface is configured to connect the camera to the motherboard of the terminal via a cable, a board-to-board connector, a spring connection or the like, and transmit the collected image to the memory 720. The digital signal processor processes the collected images using mathematical operations, converts the collected analog images into digital images, and transmits the same to the memory 720 via the interface.

Although not illustrated, the terminal 700 may further include a Bluetooth module, etc., which will not be repeated herein.

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely examples of embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. An audio coding method, comprising:
   obtaining an $i^{th}$ audio frame in n consecutive audio frames and obtaining an $i^{th}$ piece of coded data and an $i^{th}$ piece of redundant data based on the $i^{th}$ audio frame, wherein the $i^{th}$ piece of coded data is obtained by directly coding the $i^{th}$ audio frame of source audio data through a first coding scheme, and the $i^{th}$ piece of redundant data is obtained by directly coding the $i^{th}$ audio frame of the source audio data through a second coding scheme and buffering the coded $i^{th}$ audio frame, wherein n is a positive integer, and $1 \leq i \leq n$, and wherein the first coding scheme and the second coding scheme are the same in input, and the first coding scheme and the second coding scheme are different in at least one of sampling rate or compression ratio;
   packing the $i^{th}$ piece of coded data and at most m pieces of redundant data before the $i^{th}$ piece of redundant data into an $i^{th}$ audio data packet, wherein m is a preset positive integer;
   receiving a packet loss ratio transmitted by a receiving end; and
   adjusting the second coding scheme in response to the packet loss ratio reaching a packet loss ratio threshold, wherein when the packet loss ratio is less than the packet loss ratio threshold, the second coding scheme adopts a coding scheme with a higher compression ratio, and when the packet loss ratio is greater than the packet loss ratio threshold, the second coding scheme is adjusted to a coding scheme with a lower degree of distortion.

2. The method of claim 1, wherein packing the $i^{th}$ piece of coded data and the at most m pieces of redundant data before the $i^{th}$ piece of redundant data into the $i^{th}$ audio data packet comprises at least one of:
   packing a first piece of coded data into a first audio data packet when i=1;
   packing the $i^{th}$ piece of coded data and (i−1) pieces of redundant data before the buffered $i^{th}$ piece of redundant data into the $i^{th}$ audio data packet when $1<i\leq m$; or
   packing the $i^{th}$ piece of coded data and a buffered $(i-m)^{th}$ piece of redundant data to a buffered $(i-1)^{th}$ piece of redundant data into the $i^{th}$ audio data packet when $m<i\leq n$.

3. The method of claim 1, further comprising:
   receiving consecutive packet loss information transmitted by the receiving end, wherein the consecutive packet loss information is used to indicate a quantity of consecutive lost packets; and
   determining a value of m according to at least one of the packet loss ratio or the consecutive packet loss information, wherein the value of m is positively correlated with the packet loss ratio.

4. The method of claim 3, wherein the value of m corresponds to a redundancy level;
   the method further comprises:
   adjusting the redundancy level according to the consecutive packet loss information, wherein the redundancy level is positively correlated with the consecutive packet loss information.

5. The method of claim 3, wherein the value of m is greater than a quantity of consecutive lost packets.

6. The method of claim 1, further comprising:
   after packing a current audio data packet, adjusting, according to the packet loss ratio, at least one of a sampling rate or a compression ratio of subsequent audio frames for coding, wherein the sampling rate is positively correlated with the packet loss ratio, and the compression ratio is negatively correlated with the packet loss ratio.

7. The method of claim 6, wherein the sampling rate is a number of samples that are taken from consecutive analog signals and form discrete signals per second;
   the compression ratio is a ratio of size of audio data after coding and compression to size before coding and compression.

8. The method of claim 1, further comprising:
   collecting a sound signal to obtain source audio data, wherein the source audio data comprises the n consecutive audio frames.

9. An audio decoding method, comprising:
receiving a current audio data packet;
when lost coded data exists before current coded data in the current audio data packet, selecting target redundant data from redundant data in the current audio data packet, wherein an audio frame corresponding to the target redundant data is the same as an audio frame corresponding to the lost coded data, wherein the coded data is obtained by directly coding the audio frame of source audio data through a first coding scheme, and the redundant data is obtained by directly coding the audio frame of the source audio data through a second coding scheme and buffering the coded audio frame, and wherein the first coding scheme and the second coding scheme are the same in input, and the first coding scheme and the second coding scheme are different in at least one of sampling rate or compression ratio;
decoding the target redundant data and the current coded data; and
transmitting a packet loss ratio to a transmitting end and causing the transmitting end to adjust the second coding scheme in response to the packet loss ratio reaching a packet loss ratio threshold,
wherein when the packet loss ratio is less than the packet loss ratio threshold, the second coding scheme adopts a coding scheme with a higher compression ratio, and when the packet loss ratio is greater than the packet loss ratio threshold, the second coding scheme is adjusted to a coding scheme with a lower degree of distortion.

10. The method of claim 9, further comprising:
when a timestamp of the current coded data and a timestamp of the received coded data are not consecutive and the timestamp of the current coded data and a timestamp of the received redundant data are not consecutive, determining that the lost coded data exists before the current coded data.

11. The method of claim 9, wherein selecting the target redundant data from the redundant data in the current audio data packet comprises:
selecting, according to a timestamp of the redundant data in the current audio data packet, redundant data with a timestamp that is different from a timestamp of the received coded data and is different from a timestamp of the received redundant data as the target redundant data.

12. The method of claim 9, wherein decoding the target redundant data and the current coded data comprises:
sorting the target redundant data and the current coded data according to a timestamp of the target redundant data and a timestamp of the current coded data, wherein a quantity of pieces of target redundant data is w, and w is a positive integer; and
sequentially decoding the target redundant data and the current coded data in ascending order of timestamps, to obtain (w+1) pieces of audio frames.

13. The method of claim 9, further comprising:
calculating a current packet loss ratio every predetermined duration; and
transmitting the current packet loss ratio to a transmitting end.

14. A computer device, comprising a processor and a memory, wherein the memory is configured to store at least one instruction, which when loaded and executed by the processor, causes the processor to implement the audio coding method of claim 1.

15. A computer device, comprising a processor and a memory, wherein the memory is configured to store at least one instruction, which when loaded and executed by the processor, causes the processor to implement the audio decoding method of claim 9.

* * * * *